(12) United States Patent
Takano et al.

(10) Patent No.: US 6,757,025 B1
(45) Date of Patent: Jun. 29, 2004

(54) METHOD FOR SWITCHING INPUT TERMINALS BASED ON INCOMING SIGNAL FORMAT

(75) Inventors: Hiroshi Takano, San Diego, CA (US); Satoshi Kobayashi, Tokyo (JP); Kazuhiro Suzuki, Kanagawa (JP); Makoto Sato, Tokyo (JP); Yuji Kimura, Tokyo (JP)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 0 days.

(21) Appl. No.: 09/541,161

(22) Filed: Mar. 31, 2000

Related U.S. Application Data

(60) Provisional application No. 60/128,535, filed on Apr. 9, 1999.

(51) Int. Cl.[7] ................................................. H04N 3/27
(52) U.S. Cl. ....................................... 348/554; 348/555
(58) Field of Search ................................. 348/554–558, 348/460, 473, 474, 706, 707, 553; H04N 3/27

(56) References Cited

U.S. PATENT DOCUMENTS

| | | | |
|---|---|---|---|
| 5,347,318 A | * | 9/1994 | Kobayashi et al. .......... 348/556 |
| 5,432,558 A | * | 7/1995 | Kim ........................... 348/460 |
| 5,461,427 A | | 10/1995 | Duffield et al. |
| 5,557,337 A | * | 9/1996 | Scarpa ......................... 348/558 |
| 5,574,965 A | | 11/1996 | Welmer |
| 5,598,221 A | | 1/1997 | Miyahara et al. |
| 5,666,170 A | | 9/1997 | Stewart |
| 5,666,363 A | | 9/1997 | Osakabe et al. |
| 5,717,471 A | | 2/1998 | Stewart |
| 5,774,193 A | | 6/1998 | Vaughan |
| 5,774,195 A | | 6/1998 | Miyahara et al. |
| 5,787,259 A | | 7/1998 | Haroun et al. |
| 5,802,017 A | | 9/1998 | Sato et al. |
| 5,828,418 A | | 10/1998 | Lee |
| 5,850,266 A | | 12/1998 | Gimby |
| 5,883,621 A | | 3/1999 | Iwamura |
| 5,926,228 A | | 7/1999 | Jeon et al. |
| 5,933,430 A | | 8/1999 | Osakabe et al. |
| 5,940,737 A | | 8/1999 | Eastman |
| 5,963,842 A | | 10/1999 | Kinugawa |
| 5,973,625 A | | 10/1999 | Nam |
| 5,973,748 A | * | 10/1999 | Horiguchi et al. .......... 348/554 |
| 6,072,983 A | | 6/2000 | Klosterman |
| 6,091,458 A | | 7/2000 | Jeon et al. |
| 6,104,437 A | | 8/2000 | Taira et al. |
| 6,108,044 A | * | 8/2000 | Shin .......................... 348/555 |
| 6,166,774 A | | 12/2000 | Plonka |
| 6,216,266 B1 | | 4/2001 | Eastman et al. |
| 6,285,408 B1 | | 9/2001 | Choi et al. |
| 6,285,824 B1 | | 9/2001 | Yanagihara et al. |
| 6,335,762 B1 | | 1/2002 | Lee |
| 6,344,871 B1 | | 2/2002 | Liu et al. |
| 6,349,115 B1 | | 2/2002 | Tahara et al. |
| 6,369,857 B1 | | 4/2002 | Balaban et al. |
| 6,373,527 B1 | | 4/2002 | Lee |
| 6,377,309 B1 | | 4/2002 | Ito et al. |
| 6,380,984 B1 | | 4/2002 | Inoue et al. |
| 6,430,233 B1 | | 8/2002 | Dillon et al. |
| 6,437,834 B1 | | 8/2002 | Tagami |

* cited by examiner

*Primary Examiner*—Michael H. Lee
(74) *Attorney, Agent, or Firm*—Blakely, Sokoloff, Taylor & Zafman LLP

(57) ABSTRACT

A method and an apparatus for switching input terminals based on a transmitted signal format are disclosed. The method includes issuing a command to a receiver when a format of the signal has changed from digital to analog. The receiver switches to an analog input terminal according to the command. The apparatus includes a transmitter and a receiver connected with each other with a digital interface and an analog interface. The transmitter has a command generator that issues the command. The receiver includes a switch to select an input terminal, and a selector to control the switch according to the command provided from the transmitter. The receiver also includes a digital signal processor coupled to the digital interface to decode digital signals.

6 Claims, 5 Drawing Sheets

| Situation | Step | Action by User | Signal Flow | IRD | DTV |
|---|---|---|---|---|---|
| Watch DVHS[HD] | 1 | (Watching DVHS-HD) | CH63, CH X, CH Y; DVHS→DTV (D) | (P-to-P with DVHS, Input=DVHS-HD; Input from CH X, decoding HD) | (Output TS to CH-X) |
| Watch DVHS [Analog] | 2 | | CH63, CH X, CH Y; DVHS CONNECT Command→DTV | | Play Analog contents, DVHS sends CONNECT command to DTV |
| | 3 | | CH63, CH X, CH Y; DVHS→DTV (A) | Receives command then Change Input to DVHS-Analog | |

Fig. 5

METHOD FOR SWITCHING INPUT TERMINALS BASED ON INCOMING SIGNAL FORMAT

This application claims the benefit of U.S. Provisional Application No. 60/128,535 filed Apr. 9, 1999.

BACKGROUND

1. Field of the Invention

The present invention is related to the field of signal transmission.

2. Related Art

Signal transmission between electronics appliances can be carried out in various formats via digital and analog interfaces. A signal has traditionally been transmitted in an analog format using an analog interface. As a result of recent developments in digital signal processing technologies, a digital interface is nowadays becoming a major trend in signal transmission. Particularly, the development of standards regarding digital interfaces, such as IEEE1394, allows digital signals in various formats to be transmitted through a single digital interface.

As technology transitions from analog to digital signal processing, signals may be generated in various formats. The various formats that may be transmitted, including analog, are not always transmitted in one particular format. That is, analog signals co-exist along with digital signals. Because of this, some appliances are designed to cope with signals in different formats, digital and analog. In fact, some transmitters can provide a signal in a digital format to a digital interface while transmitting an analog signal via an analog interface. Receivers have both a digital input terminal and an analog input terminal, so that they are capable of receiving both digital and analog signals.

Under such a circumstance, it is vital to ensure that a signal is being received at an appropriate input terminal of a receiver, either digital or analog, otherwise the receiver cannot operate correctly.

FIG. 1 illustrates an exemplary arrangement of a signal transmitting system comprising a digital video high speed (DVHS) tape recorder/player 10 and a digital TV (DTV) 12. The DVHS 10 and the DTV 12 are connected with each other via a digital interface cable 14 as well as an analog video/audio cable 16. In this arrangement, the DVHS 10 and the DTV 12 work as a transmitter and a receiver, respectively.

The DVHS 10 is a digital video/audio recorder developed based on the conventional analog VHS. The DVHS 10 is capable of recording and playing analog signals in the VHS format. It also operates with a digital signal, i.e., capable of digital recording. The DVHS 10 does not encode or decode a signal. Thus, the DHVS 10 records and plays a digital signal in the unchanged original format.

Accordingly, the DTV 12 has a decoder to decode the digital signal from the DVHS 10 into an analog signal so that images and voices are monitored on the DTV 12.

Since no regulation is applied to the recording format, it is probable that a digital signal and an analog signal are recorded on a single recording medium, e.g., videotape. FIG. 2 shows an exemplary signal pattern recorded on videotape 20, on which an analog signal is recorded after a digital signal.

Within the arrangement described above, for instance, the format of the signal transmitted from the DVHS 10 will change from a digital format to the analog format at some point as the videotape 20 is running. If a change of format has occurred, the analog signal is provided to the wrong input terminal, and, consequently, the DTV 12 will not be able to reproduce a picture and/or voice based upon the incoming signal because of the difference of the format. In other words, a picture and voice on the DTV 12 will be suddenly lost as soon as the signal format changes.

In order to avoid such a faulty state, it is necessary to switch between the digital and analog input terminals of the receiver. Therefore, the incoming signal is obtained from an appropriate input terminal no matter what the format of the incoming signal format is, digital or analog.

For the foregoing reasons, there is a need for switching between input terminals based on transmitted signal format.

SUMMARY

The present invention is directed to a method and apparatus that satisfies the need for switching between input terminals based on a transmitted signal format.

A transmitted signal is received at a first input terminal of a receiver. Once the signal is received, a command is issued when a format of the transmitted signal changes. As a result of the issued command, automatic switching to a second input terminal of the receiver from the first input terminal to receive the transmitted signal.

More specifically, the method includes selecting an input terminal of the receiver, either a digital input terminal or an analog input terminal, when the command is issued.

In this method, a first command may be issued when the transmitted signal format changes from a digital format to an analog format. The receiver will then select its analog input terminal to receive the incoming signal when the command is received. Also, a second command may be issued when the transmitted signal format has changed from an analog format to a digital format, so that the receiver will select the digital input terminal according to the second command.

An apparatus to which the present invention is directed includes a transmitter that has a command generator. The command generator issues a command to the receiver when a format of the signal changes from digital to analog. The command generator may also issue another command when the format changes from analog to digital. Such commands may be transmitted through a digital interface that connects the transmitter and receiver with each other, or through an additional communication line.

The apparatus also includes a receiver including a first input terminal, a second input terminal, a digital signal interface coupled to the first terminal, a digital signal processor coupled to the digital signal interface, and a selector for selecting the first or second input terminal to receive an incoming signal based upon a format of the incoming signal. More specifically, the selector selects an input terminal based on the command issued from the transmitter. Each input terminal may have been associated with a signal format to be received at the input terminal.

According to the present invention, since the receiver can select an appropriate input terminal itself, the receiver can operate properly, even if the format of an incoming signal changes from a first format to a second format. Therefore, there is no requirement for a user to perform a rerouting operation.

BRIEF DESCRIPTION OF THE DRAWINGS

FIG. 5 illustrates an exemplary arrangement of the DTV in a block diagram.

FIG. 5 illustrates operations of the DVHS and the DTV, and the signal flows between them, in steps.

DETAILED DESCRIPTION

Referring to the figures, exemplary embodiments of the invention will now be described. The exemplary embodiments are provided to illustrate the invention and should not be construed as limiting the scope of the invention.

Figure 1:
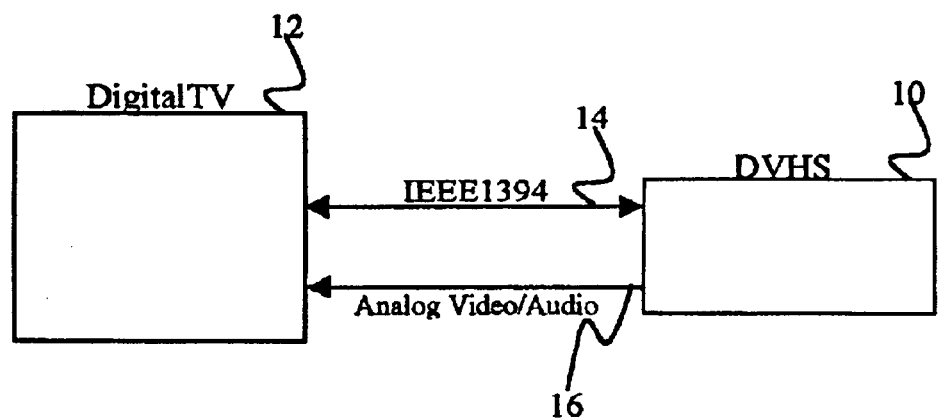
FIG. 1 illustrates an exemplary transmitting system comprising a DVHS deck (DVHS) and a digital TV (DTV) connected with each other via digital and analog interfaces.

FIG. 1 illustrates an exemplary arrangement of a signal transmitting system comprising a DVHS deck (DVHS) 10 and a digital TV (DTV) 12. Here, the DVHS 10 and the DTV 12 are connected to each other by an IEEE1394 digital interface cable 14 as well as an analog video/audio cable 16.

The digital interface cable 14 is based upon the IEEE1394 Standard for a high performance serial bus, which is capable of carrying digital video/audio signals in various digital formats, such as the DV format and MPEG2 format. The use of the IEEE1394 digital interface provides a peer-to-peer interface between various digital peripherals with up to 63 isochronous digital communication channels. Each of the devices in the system is allowed to communicate with the other devices via the IEEE1394 digital interface 14. Assuming both the DVHS 10 and the DTV 12 are also based upon the IEEE1394 Standard, the digital interface cable 14 allows a digital video/audio signal from the DVHS 10 to be transmitted to the DTV 12.

The analog interface cable 16 is also provided between the DVHS 10 and the DTV 12. This is because both a digital signal and an analog signal can be provided from the DVHS 10. The analog signal is transmitted through this additional interface, i.e., analog video/audio cable 16.

Figure 3:
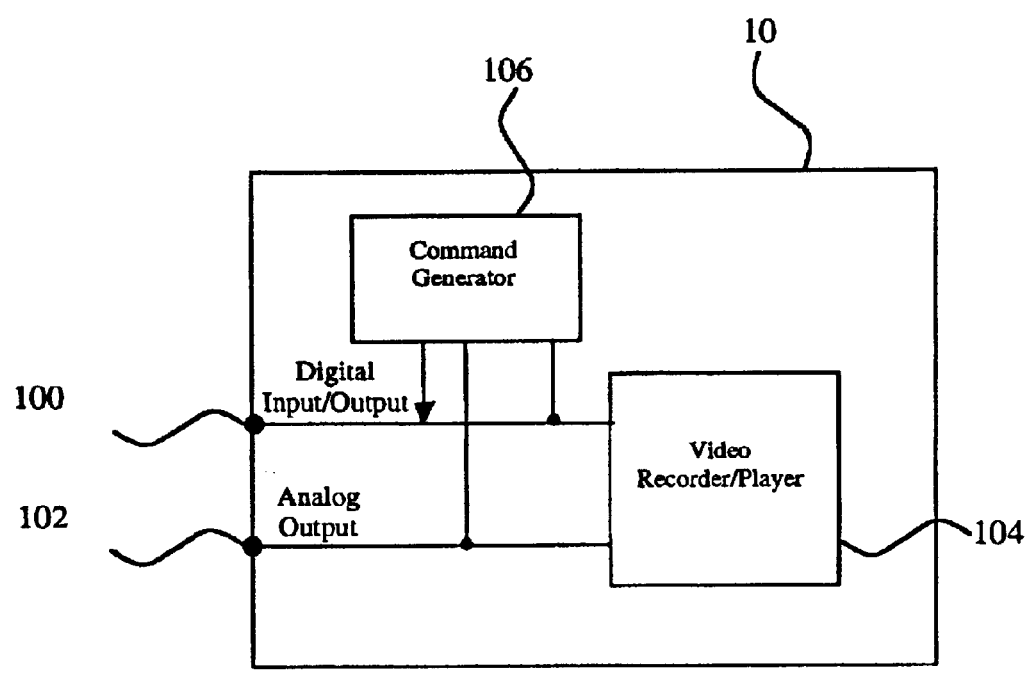
FIG. 3 illustrates an exemplary arrangement of the DVHS in a block diagram.

FIG. 3 illustrates an exemplary arrangement of the DVHS 10. The DVHS 10 includes a digital input/output terminal 100, an analog output terminal 102, a videotape recorder/player 104 and a command generator 106.

The DVHS 10 is capable of recording and playing a digital signal as well as an analog signal. More specifically, the recorder/player 104 supplies its digital video/audio output signal to the digital input/output terminal 100, while providing its analog output signal to the analog output terminal 102.

The output signal from the DVHS 10 has a field to indicate the signal format type. The format type, which may change dynamically, depends on the contents or situation of the device. For example, a DVHS can play MPEG2 and analog. The command generator 106 keeps monitoring the signal format field to determine whether the signal changes from digital to analog, or analog to digital.

In this embodiment of the present invention, the command generator 106 detects a change in the format of an output signal provided from a recorder/player 104, and issues a "CONNECT" command when the signal format has changed from digital to analog. In this embodiment, the "CONNECT" command is then transmitted to the DTV 12 via the IEEE1394 digital interface cable 14. It should be noted, however, that an additional cable might be used to transmit the "CONNECT" command to the DTV 12.

Figure 4:
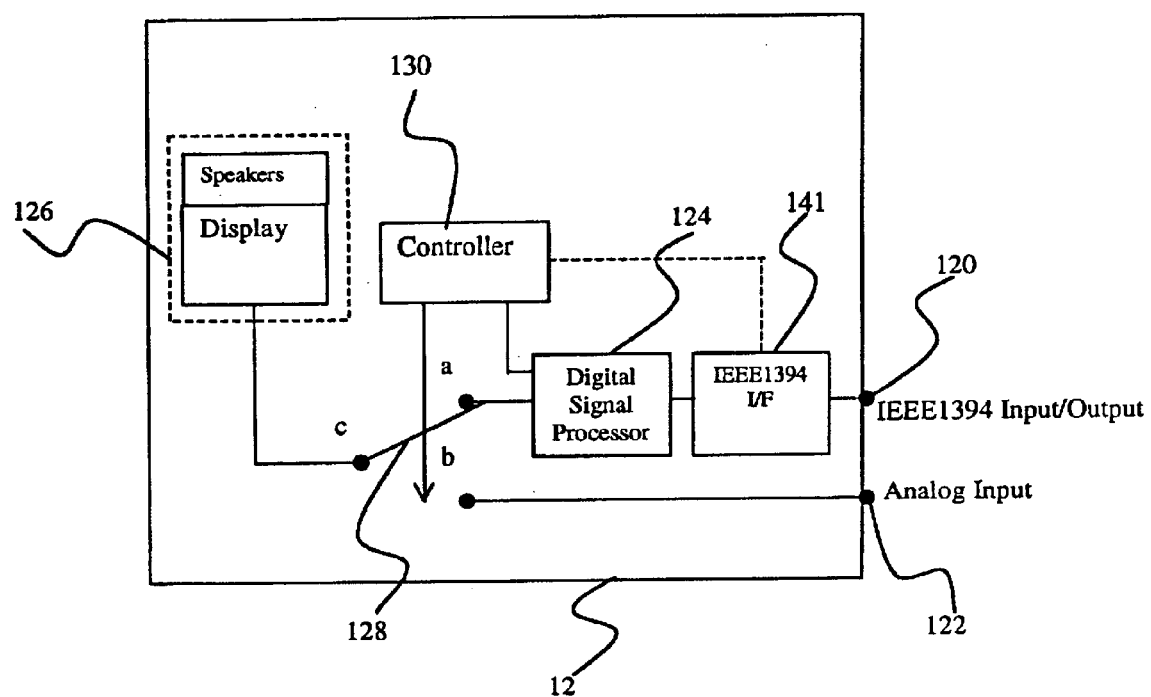

FIG. 4 shows an exemplary arrangement of the DTV 12. The DTV 12 comprises a digital input/output terminal 120, an analog input terminal 122, an IEEE1394 interface 141, a digital signal processor 124 connected to the digital input/output terminal 120, a monitor 126 including a display and speakers, a switch 128 for selecting an input terminal, and a controller 130 to control the switch 128. The digital input/output terminal 120 communicates with the digital input/output terminal 100 of the DVHS 10 via the digital interface cable 14, whereas the analog input terminal 122 is connected to the analog output terminal 102 by the analog video/audio cable 16.

Within the DTV 12, the IEEE1394 interface 141 is coupled to the digital input/output terminal 120, which in turn is coupled with the digital signal processor 124. The digital signal processor 124 decodes an incoming digital signal transmitted through the digital interface cable 14 and converts the signal into an analog signal, which the monitor 126 can cope with. This analog signal is output to a first terminal "a" of the switch 128. The analog input terminal 122 is, meanwhile, connected to a second terminal "b" of the switch 128. Accordingly, the signals provided to the first and second terminals "a" and "b" are selectively supplied to the monitor 126 via a third terminal "c" of the switch 128.

The controller 130 controls the switch 128 according to the "CONNECT" command that has been issued from the command generator 106 of the DVHS 10 and transmitted via the digital interface cable 14. Thus, when the controller 130 receives the "CONNECT" command, it causes the switch 128 to change its connection between the first and second terminals "a" and "b."

Operation

The operation of the signal transmission will be described with reference to FIG. 5.

Figure 2:
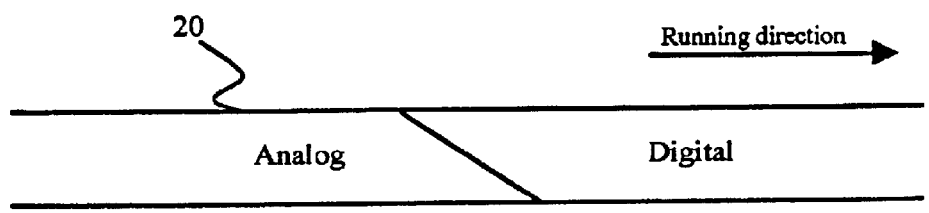
FIG. 2 illustrates an exemplary signal pattern recorded on videotape.

FIG. 5 illustrates an operation of the transmission system step by step. In FIG. 5, the column labeled "Situation" shows a format of the signal transmitted from the DHVS 10. The column labeled "Action by User" indicates the action that a user of the system is taking. Let us assume that the user is playing videotape on the DVHS 10 on which a first content has been recorded in a digital format (e.g., MPEG2-HD) and a second content has been recorded in the analog format (as shown in FIG. 2). The user is watching the video on the DTV 12. The column labeled "Signal flow" in FIG. 5 shows a signal flow from the DVHS 10 to the DTV 12 and the channel through which the signal is being transmitted. Based on the IEEE1394 Standard, the digital interface cable 14 provides up to 63 isochronous digital communication channels. These channels are denoted by "CH63," "CH X" and "CH Y" in FIG. 5.

The columns labeled "DTV" and "DVHS" indicate the operations or workings of the DHVS deck 10 and the DTV 12, respectively.

Let us assume that the DVHS 10 is playing the first content that has been recorded on the videotape 20 in the MPEG2-HD digital format at this stage. An isochronous communication, called "point-to-point" connection, is established between the DVHS 10 and the DTV 12, and the digital signal is being transmitted to the DTV 12 through one of the digital communication channels, "CH X," as illustrated by an arrow. Within the DTV 12 (refer to FIG. 4), the incoming digital signal is input to the digital signal processor 124 to be decoded into the analog video/audio signal, which the monitor 126 can cope with. The analog output of the digital signal processor 124 is being supplied to the terminal "a" of the switch 128. The switch 128 is making a connection between its terminals "a" and "c," so that the decoded video/audio signal, which is in an analog format, is being supplied to the monitor 126 via the switch 128.

As the videotape 20 is running, the first content will finish and the DVHS 10 will then start playing the second content. Once the second content has started, the DVHS 10 will supply the analog signal to the analog video/audio interface 16.

At the same time, when the DVHS 10 recognizes the change, it starts playing back an analog signal after the digital signal, i.e., when the DVHS 10 detects the change of the signal format, the command generator 106 will issue the "CONNECT" command. The "CONNECT" command is then transmitted to the DTV 12 through one of the channels of the IEEE1394 digital interface, i.e., "CH 63."

After the DVHS 10 starts playing the second content, the DTV 12 will be receiving the analog signal at its analog input terminal 122, and the analog signal will be supplied to the terminal "b" of the switch 128. The digital signal processor 124 will, meanwhile, no longer provide a usable signal for the monitor 126.

When the DTV 12 receives the "CONNECT" command from the DVHS 10 via the digital interface cable 14, the command will be supplied to the controller 130. The controller 130 will then send a command to the switch 128 to select terminal "b." As the switch 128 switches the input terminal from terminal "a" to "b," the analog signal is directed to the monitor 126.

Accordingly, the video/audio signal will be provided to monitor 126 in an acceptable format even after the format of the transmitted signal has changed. The user of the system does not have to perform selection of the input terminal herself.

The operation explained above regards the case where the format of the transmitted signal changes from digital into analog. If a third content in a digital format follows the second content, the DTV 12 will control its input terminal in the same manner. Namely, the command generator 106 will issue another command to the DTV 12 as the DVHS 10 detects the change of the format. The switch 128 of the DTV 12 will switch back to terminal "a" according to the command, so that the digital signal received at the digital input/output terminal 120 is directed to the monitor 126.

The present invention is also applicable in circumstances where a digital signal needs to be transmitted in an analog format. Some examples of such circumstances are as follows:

Some receivers, such as DSS-SD, are incapable of decoding a digital signal in a particular format. Due to the limited capability of a receiver, the digital signal has to be decoded into an analog format before being transmitted.

Also, in certain circumstances, a better performance may be obtained from analog transmission. An electronic program guide (EPG) signal, for example, had better be transmitted from a set top box (STB) in an analog format.

The embodiments of the invention described above are, of course, subject to other variations in structure and implementation. For instance, additional devices may be inserted between various nodes, terminals, and devices in the above embodiments without materially changing their overall function. In general, the scope of the invention should be determined not by the embodiments illustrated but by the appended claims and their legal equivalents.

What is claimed is:

1. A system comprising:
a transmitter, wherein
the transmitter comprises a command generator for issuing a first command when the format of a signal has changed from a digital signal to an analog signal; and
a receiver coupled to the transmitter by a digital interface and an analog interface through which a signal is transmitted, wherein
the receiver comprises a digital input terminal connected to the digital interface, an analog input terminal connected to the analog interface, an IEEE1394 interface coupled to the digital input terminal, a signal decoder coupled to the IEEE1394 interface, and a selecting means for selecting the analog input terminal to receive the signal based on the first command issued from the transmitter.

2. The system of claim 1, wherein
the command generator issues a second command when the format of the signal has changed from an analog signal to a digital signal; and
the selecting means selects the digital input terminal to receive the signal based on the second command issued from the transmitter.

3. The system of claim 2, wherein the decoder further comprises a digital signal processor to decode and convert an incoming digital signal into an analog signal.

4. The system of claim 3, wherein a controller controls a switch to select the analog input terminal to receive the signal based on the first command issued from the transmitter.

5. The system of claim 4, wherein the controller controls the switch to select an output of the decoder to receive the signal based on the second command issued from the transmitter.

6. The system of claim 5, wherein the selected signal is displayed on a monitor coupled to the switch.

* * * * *